United States Patent [19]

Lepoix

[11] Patent Number: 4,505,510
[45] Date of Patent: Mar. 19, 1985

[54] INSTRUMENT AND CONTROL PANEL FOR AUTOMOTIVE AGRICULTURAL MACHINE

[75] Inventor: Louis Lepoix, Baden-Baden, Fed. Rep. of Germany

[73] Assignee: Klöckner-Humboldt-Deutz AG, Zweigniederlassung Fahr, Gottmadingen, Fed. Rep. of Germany

[21] Appl. No.: 967,003

[22] Filed: Dec. 4, 1978

[30] Foreign Application Priority Data

Dec. 14, 1977 [DE] Fed. Rep. of Germany ....... 2755622

[51] Int. Cl.³ .............................................. B60K 37/00
[52] U.S. Cl. ......................................... 296/70; 180/90
[58] Field of Search .......... 286/70; 180/77 R, 77 MC, 180/77 TC, 77 N, 77 D, 77 P, 77 Q, 77 J, 77 H, 77 HT, 77 C, 77 S, 77 M, 77 T, 90, 315; 244/17.11; 280/752

[56] References Cited

U.S. PATENT DOCUMENTS

| | | | |
|---|---|---|---|
| 2,719,394 | 10/1955 | Thomann et al. | |
| 3,362,247 | 1/1968 | Watts | 180/77 AM |
| 3,550,715 | 12/1970 | Johnson | 180/77 R |
| 4,026,379 | 5/1977 | Dunn et al. | 180/77 S |

OTHER PUBLICATIONS

Boeing Disclosure of Instrument Panel for Model 234, Chinook.

Primary Examiner—Joseph F. Peters, Jr.
Attorney, Agent, or Firm—Karl F. Ross; Herbert Dubno

[57] ABSTRACT

An instrument and control panel for a vehicle, preferably an agricultural machine, having a forwardly facing driver's seat is provided to the right-hand side of the seat and has an upper wall which is inclined to the horizontal and extends upwardly back in the travel direction. This upper wall is formed with at least two recesses each having a base, a front side at an obtuse angle to the respective base, and a back side. Instruments and controls are mounted on the front side and base of the two recesses. The rear recess may be laterally closed while the front recess is transversely open in both directions for best driver view past the instrument control panel.

10 Claims, 2 Drawing Figures

INSTRUMENT AND CONTROL PANEL FOR AUTOMOTIVE AGRICULTURAL MACHINE

FIELD OF THE INVENTION

The present invention relates to an instrument and control panel. More particularly this invention concerns such a panel usable in an automotive agricultural machine such as a mower, combine, tractor, field chopper or the like.

BACKGROUND OF THE INVENTION

An automotive vehicle, in particular an agricultural machine which can perform various operations as it moves along the ground, has a great many instruments which allow the driver to monitor the various functions of the machine, and a great many controls which allow the driver to vary these functions. It is necessary that the instruments be in a location where the operator sees them easily without unnecessarily taking his or her eyes off the ground ahead of the machine in the direction of travel thereof. Similarly the controls must be within easy reach, and must be so positioned that after some experience with the machine the operator can easily find and operate the controls without having to grope or look for them.

A standard solution is to mount all of the instrument and control devices in a so-called panel, normally constituted as a box. This box or panel is frequently positioned next to the operator's seat, normally on the right-hand side thereof relative to the forwardly facing driver's seat. Such an arrangement has some advantages, but also has the disadvantage that some of the controls and instruments at least are positioned so that the driver has to take his or her eyes completely off the ground in front of the machine to look at or find them, and similarly the controls are frequently so positioned that the driver must lean into an uncomfortable position to reach them.

OBJECTS OF THE INVENTION

It is therefore an object of the instant invention to provide a biotechnically improved instrument and control panel for a vehicle.

Another object of this invention is the provision of such a panel which is particularly adapted for use in an agricultural machine.

SUMMARY OF THE INVENTION

These objects are attained in accordance with the instant invention in such a panel which is to the side of the driver's seat and which has an upper wall inclined to the horizontal and extending upwardly back in the travel direction. This upper wall is formed with at least two recesses each having a base, a front side at an obtuse angle to the respective base, and a back side. Instruments and control devices are mounted at least on the front side, and may also be mounted on the bases and on the wall portions between the recesses.

More particularly, according to this invention the panel has two such recesses—a front recess and a back recess—the former being transversely throughgoing and the latter being open transversely toward the driver's seat and having a lateral side away from this seat and carrying at least one instrument or control device.

The frontside of the recess is inclined backwardly away from the seat and the entire panel is constituted as a box which sits on top of a pedestal having an upper support surface inclined in a manner parallel to that of the upper wall of the panel. Releasable holding means is provided between the two for servicing of the instruments and controls. Similarly, it is possible to provide at least some of the controls in the pedestal with their handles or operating levers extending upwardly through the instrument control panel. The various electrical and electronic connections for the control panel can all made through a common plug and jack so that, if necessary, the entire panel can be lifted off and unplugged for servicing.

SPECIFIC DESCRIPTION

Figure 1:
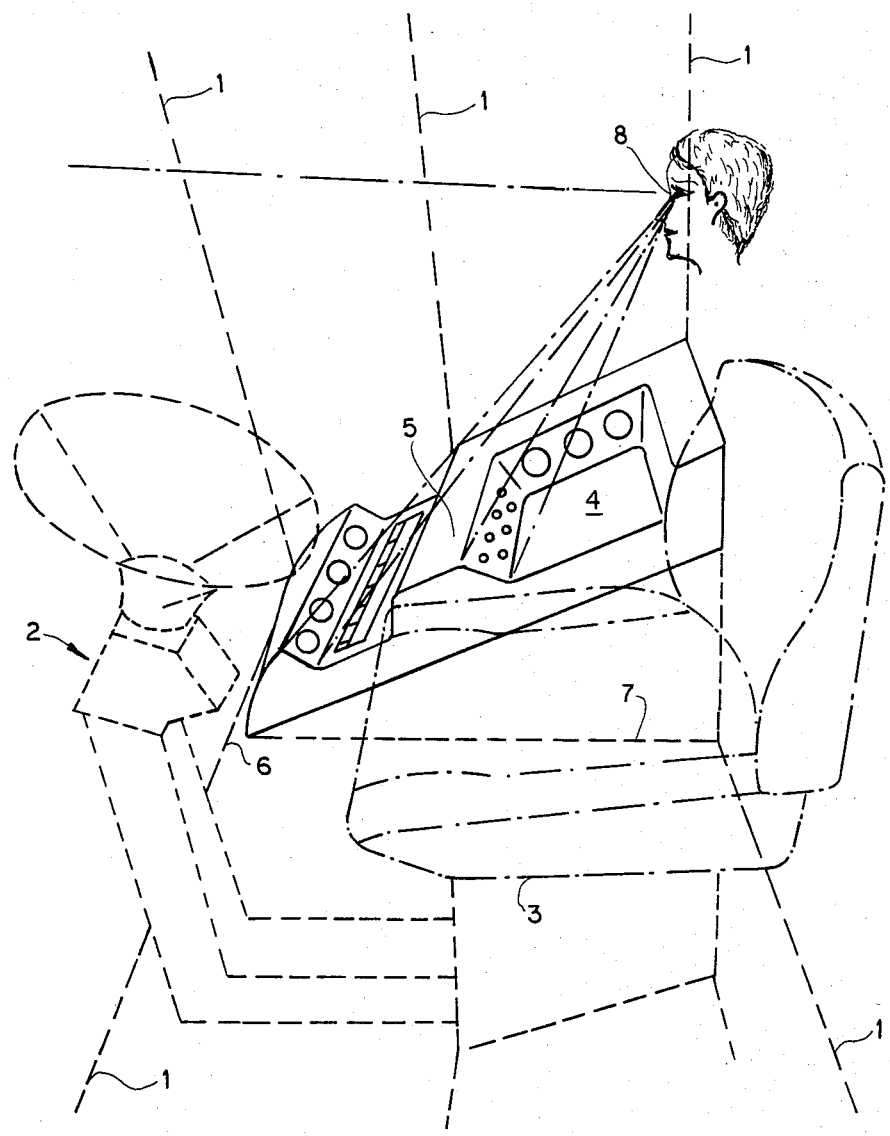
FIG. 1 is a largely schematic view illustrating the control panel according to the instant invention in an agricultural vehicle.

As shown in FIG. 1 an agricultural vehicle has an operator's cabin whose physical limits and corners are shown by dashed lines 1. This cabin encloses a steering column 2 positioned in front of an operator's seat 4. To the right-hand side of the driver's seat 3 there is a control assembly 4 constituted mainly as so-called instrument control panel 5 having a front edge 6 lying at the extreme front of the passenger compartment and sitting on a pedestal 7 fixed in the vehicle. The upper wall of the control panel 5 extends upwardly and backwardly at an angle of approximately 30° to the horizontal so as to align the instruments as will be described below in such a manner that they can easily be seen from the eye region 8 of the operator sitting on the seat 3.

Figure 2:
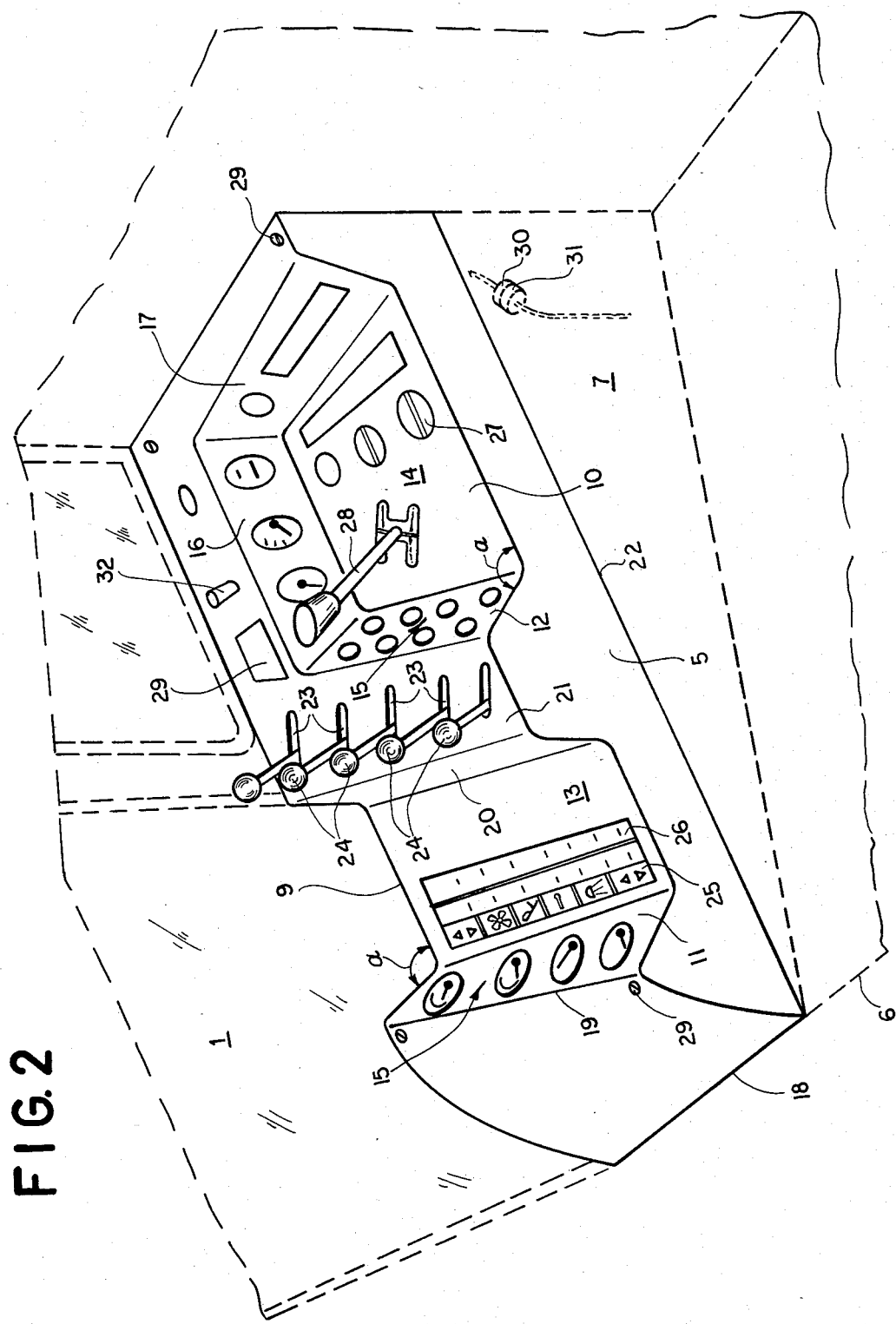
FIG. 2 is a large-scale view of a detail of FIG. 1.

More particularly, as shown in FIG. 2 the instrument and control panel 5 has a front recess 9 and a back recess 10 having respective front sides 11 and 12 extending at angles a of approximately 120° to the respective bases 13 and 14. Each of these front sides 11 and 12 is generally planar and carries a plurality of instruments 15, mainly control lights and meters. These sides 11 and 12 are also angled somewhat backwardly in the direction of travel, that is they are not perpendicular to this direction but instead extend somewhat backwardly from the driver's seat 3 so as to give right-angle eye contact with the region 8.

Whereas the front recess 9 is transversely throughoing, the rear recess 10 is closed by a side wall 16, and also has a back wall 17 each of which can carry instruments also. The instruments such as the heater or the radio which are less critical for functioning of the machine and which only need occasional adjustment are provided on these sides 16 and 17.

The upper wall of the panel 5 curves upwardly from the extreme front edge 18 to the top edge 19 of the side 11. This allows good driver view down past the panel 5. The rear wall 20 of the recess 9 is almost out of the driver's view so is not provided with any instrumentation or controls. The flat portion 21 between these walls 20 and 12 is formed here with five throughgoing slots 23 through each of which extends a control lever 24 for a respective function of the agricultural vehicle in question. These levers 24 may be connected to controls that are not mounted in the panel 5, but that instead are provided in a pedestal 7, lying below the upper surface 22 thereof which extends parallel to the upper wall of the control panel. The floor or base 13 of the front recess 9 is provided with indicator lights 25 for the various functions of the vehicle, and with a depth indicator 26 particularly useful on a mower or threshing machine to indicate the height of the intake mechanism above the ground. This device 26 may be constituted as a colored drum visible through a slot in the wall 13.

Heater or air-conditioning outlets 27 are provided on the base wall 14 of the rear recess 10, and a standard 4-speed transmission lever 28 may stand upwardly through an 8-shape slot in this wall 14. The transmission connected to this lever 28 may itself be provided in the pedestal 7 or even therebelow. An ash-tray 29 and cigarette lighter 30 are provided on the top wall adjacent the sidewall 16 of the recess 10.

The entire panel 5 is secured releasably on the upper surface 22 of the pedestal 7 by four screws 29 that allow it to be readily removed for servicing. In addition all of the various electrical components are connected via a multiconductor cable and plug 30 to a jack 31 carried on a similar such cable in the pedestal 7. Thus the panel can be removed and unplugged rapidly for servicing, and for access to the underlying equipment.

I claim:

1. An instrument and control panel for controlling and monitoring the functions of an automotive agricultural vehicle adapted to travel in a normal forward travel direction and having a forwardly facing driver's seat, said panel being mainly to the side of said seat relative to said direction and comprising:
   an upper wall inclined to the horizontal laterally adjacent said seat and extending upwardly back in said travel direction from a front edge well below the forward field of view of a driver in said seat, said upper wall being formed with at least two recesses each having a front side, a base, and a back side; and
   instrument and control devices mounted at least on said front sides and within reach of the driver in said seat.

2. The panel defined in claim 1 herein said bases also are inclined to the horizontal and extend upwardly back in said travel direction.

3. The panel defined in claim 2 wherein said panel has two such recesses—a front recess and a back recess—the former being transversely throughgoing and the latter being open transversely toward said driver's seat and having a lateral side away from said seat and carrying at least one such device.

4. The panel defined in claim 3 wherein said front sides are inclined backwardly away from said seat.

5. The panel defined in claim 3 wherein said bases also carry such devices.

6. The panel defined in claim 3 wherein said lateral side also carres such devices.

7. The panel defined in claim 3 wherein said upper wall is formed with throughgoing slots between said recesses, said panel having control levers of instrument and control devices projecting upwardly through said slots.

8. The panel defined in claim 3 wherein said base of said rear recess is formed with a throughgoing slot, said instrument and control device including at least one gear shift lever projecting upwardly through said slot.

9. The panel defined in claim 3, further comprising:
   a pedestal next to said driver's seat and having an upper surface generally parallel to said upper wall and supporting said panel; and
   means releasably securing said panel to said pedestal.

10. The panel defined in claim 9 wherein at least some of said control devices are mounted in said pedestal and have control levers extending therefrom upwardly through said panel.

* * * * *